(12) United States Patent
Steiner et al.

(10) Patent No.: US 11,597,243 B2
(45) Date of Patent: Mar. 7, 2023

(54) METHOD FOR ADJUSTING A TPMS SENSOR MODULE, AND TPMS SENSOR MODULE

(71) Applicant: Infineon Technologies AG, Neubiberg (DE)

(72) Inventors: Christoph Steiner, St. Margarethen (AT); Michael Kandler, Sauerlach (DE); Matthias Eberl, Taufkirchen (DE); Franz Michael Darrer, Graz (AT)

(73) Assignee: Infineon Technologies AG, Neubiberg (DE)

( * ) Notice: Subject to any disclaimer, the term of this patent is extended or adjusted under 35 U.S.C. 154(b) by 21 days.

(21) Appl. No.: 17/443,217

(22) Filed: Jul. 22, 2021

(65) Prior Publication Data

US 2022/0041021 A1     Feb. 10, 2022

(30) Foreign Application Priority Data

Aug. 10, 2020     (DE) .......................... 102020120999.1

(51) Int. Cl.
  *B60C 23/04*     (2006.01)
(52) U.S. Cl.
  CPC ...... *B60C 23/0442* (2013.01); *B60C 23/0474* (2013.01); *B60C 23/0488* (2013.01); *B60C 23/0452* (2013.01)
(58) Field of Classification Search
  CPC ............ B60C 23/0408; B60C 23/0496; B60C 23/061; B60C 23/0494; B60C 23/0416; B60C 23/0433; B60C 23/0493; B60C 19/00; B60C 23/04; B60C 23/041; B60C 23/0462; B60C 23/0411; B60C 23/20; B60C 23/0444; B60C 11/24; B60C 23/0479; B60C 23/064; B60C 23/007; B60C 23/062; B60C 23/0401; B60C 23/0413; B60C 23/0488; B60C 23/06;
(Continued)

(56) References Cited

U.S. PATENT DOCUMENTS 9,387,732 B1     7/2016 Gunawan

FOREIGN PATENT DOCUMENTS

DE     10217239 A1     7/2003
DE     30024574 T2     8/2006
(Continued)

*Primary Examiner* — Andre J Allen
(74) *Attorney, Agent, or Firm* — Harrity & Harrity, LLP

(57) ABSTRACT

A tire-pressure monitoring system (TPMS) sensor module comprises a pressure sensor, which is configured to measure an internal air pressure of a tire and to generate tire pressure information, an additional, optional sensor, a transmitting/receiving device, a microcontroller unit which is configured to operate the TPMS sensor module in one of three or more different operating modes, wherein a first operating mode includes an inactive standby state, a second operating mode includes a measurement of a physical parameter using the pressure sensor and/or the additional sensor and reading the pressure sensor and/or the additional sensor using the microcontroller unit, and a third operating mode, and wherein in the second operating mode the microcontroller unit is configured to initiate a changeover from the second operating mode to the third operating mode when reading out a specified measurement event.

17 Claims, 5 Drawing Sheets

(58) Field of Classification Search
CPC .............. B60C 23/043; B60C 23/0452; B60C 23/0467; B60C 11/246; B60C 23/0498; B60C 23/02; B60C 99/006; B60C 23/0428; B60C 23/0442; B60C 23/009; B60C 2019/004; B60C 23/0425; B60C 11/243; B60C 23/004; B60C 23/00354; B60C 23/045; B60C 23/0464; B60C 23/003; B60C 23/00318; B60C 23/0472; B60C 23/066; B60C 23/00372; B60C 23/0403; B60C 23/04985; B60C 23/0406; B60C 29/02; B60C 11/00; B60C 23/006; B60C 23/00; B60C 23/044; B60C 23/008; B60C 23/0455; B60C 23/0454; B60C 23/0483; B60C 23/0461; B60C 23/0474; B60C 23/0415; B60C 23/0491; B60C 23/0489; B60C 25/002; B60C 29/064; B60C 23/00363; B60C 11/0318; B60C 23/0459; B60C 23/0471; B60C 23/0481; B60C 2019/005; B60C 23/002; B60C 23/042; B60C 2200/02; B60C 23/0422; B60C 23/0423; B60C 23/0466; B60C 23/0477; B60C 23/0405; B60C 29/06; B60C 13/001; B60C 23/0437; B60C 23/0476; B60C 25/132; B60C 23/0447; B60C 23/0427; B60C 23/0449; B60C 25/00; B60C 9/18; B60C 23/0484; B60C 13/00; B60C 19/003; B60C 23/065; B60C 23/00336; B60C 23/0486; B60C 23/08; B60C 17/00; B60C 2019/006; B60C 23/001; B60C 25/142; B60C 17/02; B60C 23/00345; B60C 23/0445; B60C 5/004; B60C 11/0083; B60C 25/145; B60C 29/00; B60C 9/02; B60C 11/0332; B60C 23/0457; B60C 25/18; B60C 11/13; B60C 23/0418; B60C 23/0469; B60C 23/12; B60C 29/066; B60C 23/068; B60C 25/005; B60C 25/138; B60C 11/03; B60C 23/005; B60C 23/0432; B60C 3/00; B60C 5/14; B60C 99/00; B60C 11/11; B60C 17/04; B60C 17/06; B60C 23/063; B60C 23/10; B60C 25/007; B60C 25/0554; B60C 25/14; B60C 29/062; B60C 99/003; B60C 11/032; B60C 11/12; B60C 13/003; B60C 19/001; B60C 23/0435; B60C 23/126; B60C 23/127; B60C 23/16; B60C 29/068; B60C 3/04; B60C 9/20; B60C 11/01; B60C 11/0302; B60C 13/02; B60C 25/056; B60C 29/005; B60C 29/04; B60C 5/142; B60C 11/0304; B60C 11/0306; B60C 15/06; B60C 2009/2038; B60C 2011/0374; B60C 2011/0388; B60C 2011/1213; B60C 2011/1231; B60C 2011/1245; B60C 2200/065; B60C 23/00305; B60C 23/067; B60C 23/131; B60C 23/135; B60C 23/137; B60C 23/18; B60C 25/02; B60C 7/12; B60C 11/02; B60C 17/0009; B60C 19/002; B60C 19/08; B60C 19/12; B60C 2019/007; B60C 23/00347; B60C 25/05; B60C 5/001; B60C 5/22; B60C 1/0008; B60C 1/0016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2009/2025; B60C 2011/0358; B60C 2011/1254; B60C 2017/068; B60C 2200/06; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/105; B60C 9/005; B60C 9/1807; B60C 9/28; B60C 2011/0033; B60C 23/085; B60C 25/0548; B60C 25/185; B60C 7/107; B60C 9/22; G01M 17/02; G01M 17/022; G01M 17/027; G01M 17/021; G01M 17/024; G01M 17/025; G01M 17/013; G01M 17/007; G01M 1/045; G01M 17/06; G01M 1/02; G01M 1/326; G01M 1/30; G01M 5/0058; G01M 1/26; G01M 17/0074; G01M 1/225; G01M 17/04; G01M 17/065; G01M 17/0072; G01M 17/10; G01M 7/00; G01M 1/16; G01M 99/00; G01M 7/08; G01M 1/34; G01M 17/028; G01M 17/045; G01M 3/3218; G01M 1/04; G01M 3/40; G01M 17/08; G01M 5/0091; G01M 1/365; G01M 13/04; G01M 17/03; G01M 5/0066; G01M 1/08; G01M 1/22; G01M 13/027; G01M 5/0033; G01M 1/00; G01M 1/122; G01M 15/044; G01M 3/24; G01M 3/2876; G01M 5/0075; G01M 1/06; G01M 1/12; G01M 1/24; G01M 1/32; G01M 1/36; G01M 11/081; G01M 13/023; G01M 13/025; G01M 17/00; G01M 17/0076; G01M 3/022; G01M 3/042; G01M 3/045; G01M 3/147; G01M 3/227; G01M 3/3236; G01M 5/0016; G01M 5/0025; G01M 5/0083; G01M 7/022; G01M 7/025; G01M 7/04; G01M 7/06; G01M 9/02; G01M 9/04; G01M 99/002; G01M 99/004; G01M 3/002; G01M 3/04; G01M 7/02; G01M 9/06

See application file for complete search history.

(56) References Cited

FOREIGN PATENT DOCUMENTS

| | | | | |
|---|---|---|---|---|
| DE | 102007007136 B3 | 8/2008 | | |
| DE | 102007049360 A1 | 4/2009 | | |
| DE | 102015115917 A1 * | 3/2017 | ......... | B60C 23/0454 |
| DE | 102006042679 B4 | 10/2019 | | |
| DE | 102019100105 A1 | 7/2020 | | |
| FR | 3028214 A1 * | 5/2016 | ......... | B60C 23/0457 |
| WO | WO-2015075494 A1 * | 5/2015 | ........... | B60C 23/041 |

* cited by examiner

METHOD FOR ADJUSTING A TPMS SENSOR MODULE, AND TPMS SENSOR MODULE

CROSS REFERENCE TO RELATED APPLICATION

This application claims priority to German Patent Application No. 102020120999.1, filed on Aug. 10, 2020, the contents of which are incorporated by reference herein in their entirety.

TECHNICAL FIELD

The present disclosure relates to a tire-pressure monitoring system (TPMS) sensor module and a method for adjusting a TPMS sensor module.

BACKGROUND

Nowadays, motor vehicles are increasingly equipped with TPMS modules of this kind. The primary function of a TPMS module is to measure the individual air pressure of each tire to warn the driver of sudden or gradual pressure loss. For this purpose, in so-called direct systems a TPMS module is located in each tire, which can have, in addition to the actual pressure sensor, other sensors such as an acceleration sensor and a temperature sensor, an RF transmitter and a power supply unit such as a battery.

SUMMARY

According to a first aspect, a tire-pressure monitoring system (TPMS) sensor module comprises a pressure sensor which is configured to measure an internal air pressure of a tire and to generate tire pressure information, an optional additional sensor, a transmitting/receiving device, a microcontroller unit which is configured to operate the TPMS sensor module in one of three or more different operating modes, wherein a first operating mode includes an inactive standby state, a second operating mode includes a measurement of a physical parameter using the pressure sensor and/or the additional sensor and reading of the pressure sensor and/or the additional sensor using the microcontroller unit, and a third operating mode, and wherein in the second operating mode the microcontroller unit is configured to initiate a changeover from the second operating mode to the third operating mode when reading out a specified measurement event.

According to a second aspect, a method for adjusting a tire-pressure monitoring system (TPMS) sensor module according to the first aspect comprises arranging a number of TPMS modules according to the first aspect within an environment, applying to all TPMS modules a signal which contains information about a changeover from the first operating mode to the second operating mode, applying a physical parameter to a TPMS module in such a way that the TPMS module detects a measurement event and initiates a changeover from the second operating mode to the third operating mode.

BRIEF DESCRIPTION OF THE DRAWINGS

Devices and methods according to the disclosure are described in more detail in the following with the aid of drawings. The elements shown in the drawings are not necessarily reproduced true to scale relative to each other. Identical reference signs can refer to identical components.

The elements of the drawings are not necessarily drawn to scale relative to each other. Identical reference signs refer to corresponding identical or similar parts.

DETAILED DESCRIPTION

Figure 1:
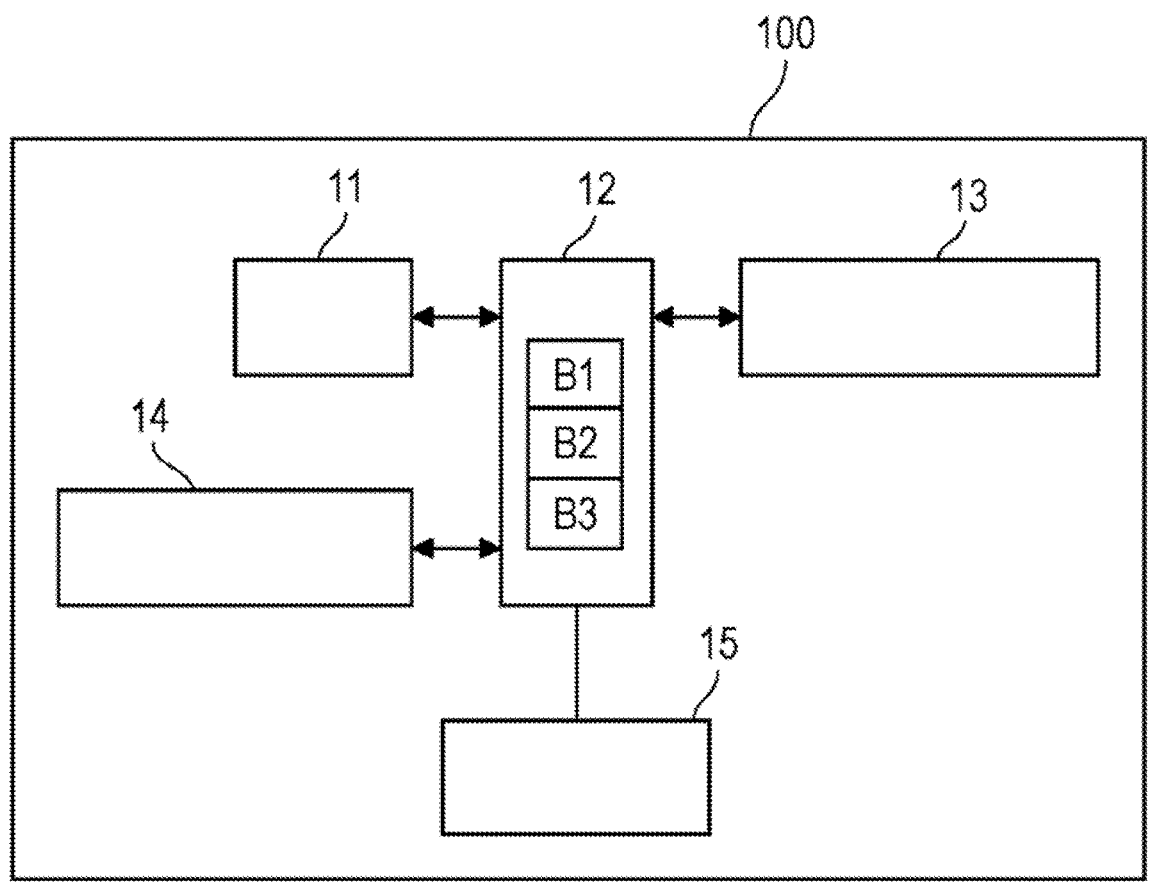
FIG. 1 shows a block wiring diagram of an example TPMS sensor module, in which the microcontroller unit can set three different operating states.

In the detailed description that follows, reference will be made to the attached drawings, which form part of this description and in which specific implementations in which the disclosure may be realized are shown for illustration purposes. A directional terminology is used, such as "top", "bottom", "front", "back", "leading", "trailing" etc. in relation to the orientation of the figure(s) to be described. Since the components of implementations can be positioned in different orientations, the directional indication is only used for illustration purposes and is not restrictive in any way. It should be understood that other implementations can also be used and structural or logical changes can be made without exceeding the scope of the present disclosure. The following detailed description is therefore not to be understood in a restrictive sense, and the scope of the present disclosure is defined by the attached claims.

It should be understood that the features of the various example implementations described herein can be combined with one another, unless expressly stated otherwise.

As used in this specification, the terms "bonded", "attached", "connected", "coupled" and/or "electrically connected/electrically coupled" do not mean that the elements or layers must be directly in contact with each other; intermediate elements or layers can be provided between the "bonded", "attached", "connected", "coupled" and/or "electrically connected/electrically coupled" elements. According to the disclosure, however, the above terms may optionally have the specific meaning that the elements or layers are directly in contact with each other, e.g. that no intermediate elements or layers are provided between the "bonded", "attached", "connected", "coupled" and/or "electrically connected/electrically coupled" elements.

In addition, the word "over" used in relation to a part, an element, or a material layer that is formed or arranged "over" a surface may mean herein that the part, element, or material layer is "indirectly" arranged (for example, placed, formed, deposited, etc.) on the implied surface, with one or more additional parts, elements, or layers being arranged between the implied surface and the part, element, or material layer. However, the word "over" used in relation to a part, an element, or a material layer that is formed or arranged "over" a surface can optionally also have the specific meaning that the part, the element, or material layer is arranged (e.g. placed, molded, deposited, etc.) "directly on", e.g. in direct contact with, the implied surface.

Typical TPMS sensor modules may be configured in the manner of a state machine (e.g., a TPMS sensor module may comprise a microcontroller that always operates the TPMS sensor module in one of a plurality of operating states). After the manufacture and installation of a TPMS sensor module, the TPMS sensor module is in an initial operating state, which includes an inactive standby state. The TPMS sensor module must then be transferred to other operating states in stages. A situation can arise in which a number of TPMS sensor modules are located close to each other in an environment, such as a manufacturing hall, but must be addressed individually in order to change their respective operating states.

Some implementations described herein relate to a system for adjusting a TPMS sensor module in a situation in which a number of TPMS sensor modules are located close to each other in an environment. The system may apply, to all TPMS sensor modules, a signal which contains information about a changeover from a first operating mode to a second operating mode. The system may apply a physical parameter to a TPMS sensor module, of the TPMS sensor modules, in such a way that the TPMS sensor module detects a measurement event and initiates a changeover from the second operating mode to a third operating mode based on detecting the measurement event.

FIG. 1 shows a block wiring diagram of an example TPMS sensor module.

The tire-pressure monitoring system (TPMS) sensor module 100 comprises a pressure sensor 11, which is configured to measure an internal air pressure of a tire and to generate tire-pressure information, an acceleration sensor 14, a transmitting/receiving device 13 and a microcontroller unit 12 which is configured to operate the TPMS sensor module 100 in one of three or more different operating modes. A first operating mode B1 includes an inactive standby state, a second operating mode B2 includes a measurement of a physical parameter using the pressure sensor 11 and/or the acceleration sensor 14, and reading off the pressure sensor 11 and/or the acceleration sensor 14 by the microcontroller unit 12, and a third operating mode B3, wherein in the second operating mode the microcontroller unit 12 is configured to initiate a changeover from the second operating mode to the third operating mode when reading out a specified measurement event.

The third operating mode can include a test run in which the functionality of the sensors (e.g., the pressure sensor 11 and/or the acceleration sensor 14) is tested. In some implementations, only one or only individual selected sensors is/are tested, such as the pressure sensor 11 and/or the acceleration sensor 14. In some implementations, all sensors present are tested.

In some implementations, instead of the acceleration sensor 14, another sensor such as a temperature sensor, a magnetic field sensor, an electrical antenna or a capacitive proximity sensor can also be used. The acceleration sensor 14 can also be configured as a microphone, in particular as a micro-electromechanical (MEMS) microphone.

The physical parameter measured in the second operating mode B2 can be a pressure, an acoustic signal, an acceleration, a temperature, a magnetic field, an electrical field, or a capacitance. Accordingly, the specified measurement result of the physical parameter can be a specified value for a pressure, an acoustic signal, an acceleration, a temperature, a magnetic field, an electric field, or a capacitance.

In some implementations, the transmitting/receiving device 13 is the only transmitting/receiving device present in the module 100.

The transmitting/receiving device 13 can then be configured to receive a signal that contains information about a changeover from the first operating mode to the second operating mode and the microcontroller unit 12 can be configured to initiate a changeover from the first operating mode to the second operating mode after receiving the signal.

The transmitting/receiving device 13 can be a Bluetooth or WLAN transmitting/receiving device. An example implementation of this will be shown below.

The microcontroller unit 12 can be configured to maintain the second operating mode for a predetermined time period and to exit the second operating mode after expiry of the time period if no specified measurement event has been measured. This can mean performing a changeover to the first operating mode or performing error handling or issuing an error message.

Figure 2:
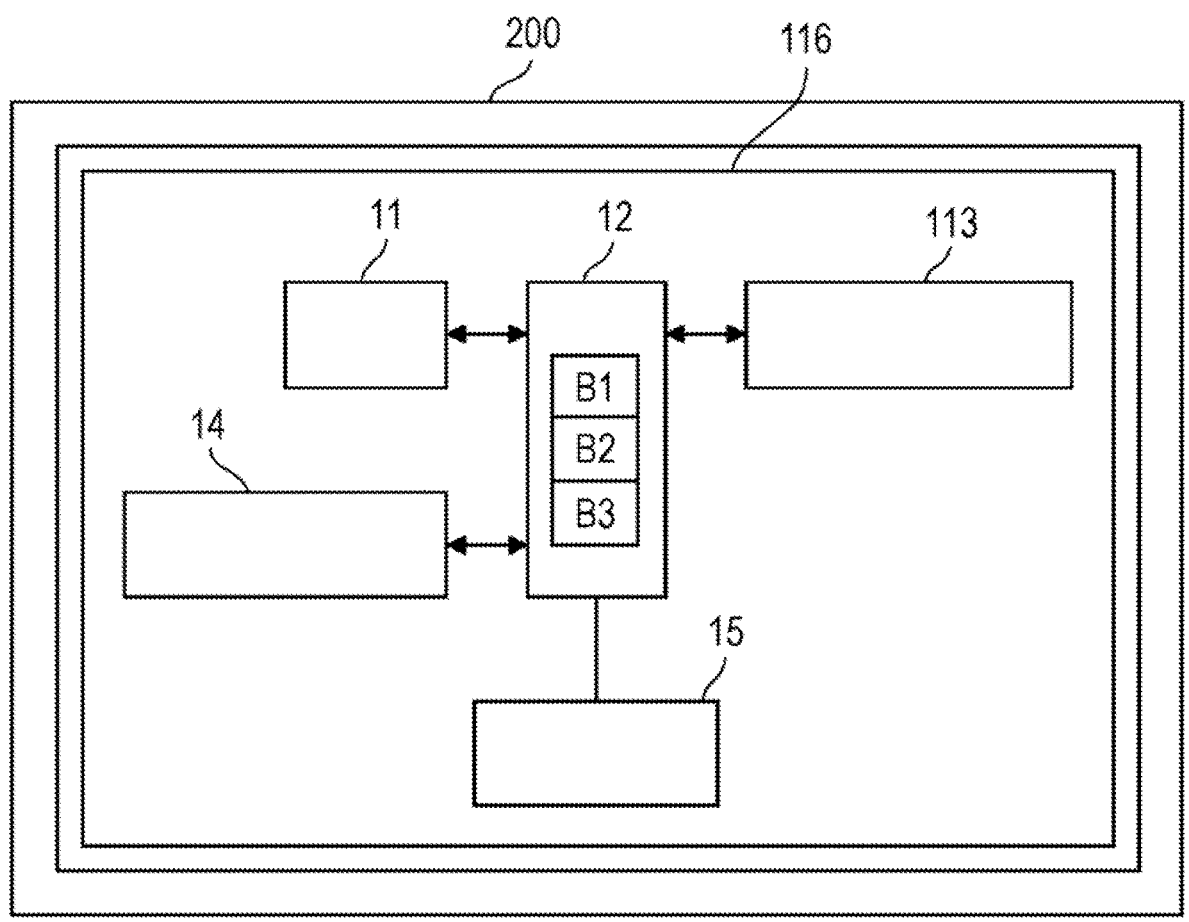
FIG. 2 shows a block wiring diagram of another example TPMS sensor module in which a wireless transmitting/receiving device is used, which is connected to an antenna integrated in the housing.

FIG. 2 shows a block wiring diagram of another example TPMS sensor module.

The TPMS sensor module 200 of FIG. 2 is essentially structured like the TPMS sensor module 100 of FIG. 1, which is why the same reference signs were predominantly used. In some implementations, the transmitting/receiving device 113 of the TPMS sensor module 200 includes a Bluetooth transmitting/receiving device and, for example, transmits and receives at a frequency of 2.4 GHz. The transmitting/receiving device 113 can be conveniently connected to a conductor loop 116 integrated in the module housing and acting as an antenna. Instead of using Bluetooth as the radio standard, a transmitting/receiving device based on the WLAN wireless standard can also be used.

Figure 3:
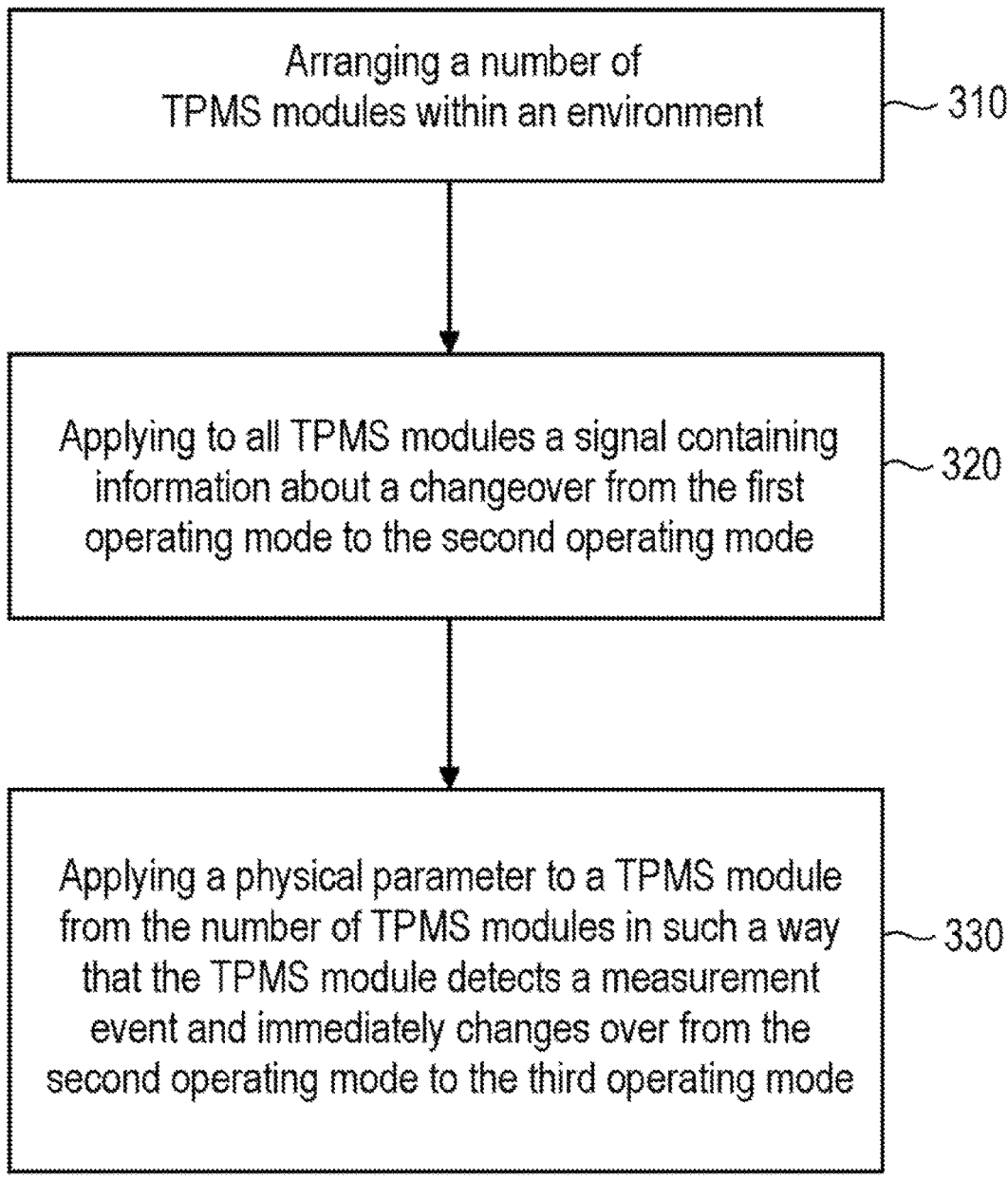
FIG. 3 shows a flowchart of a method for adjusting a TPMS sensor module.

FIG. 3 shows a flowchart of a method for adjusting a tire-pressure monitoring system (TPMS) sensor module.

The method 300 of FIG. 3 comprises arranging a number of TPMS sensor modules within an environment (310), applying to all TPMS sensor modules a signal which contains information about a changeover from the first operating mode to the second operating mode (320), and applying a physical parameter to a TPMS sensor module from the number of TPMS sensor modules in such a way that the TPMS sensor module detects a measurement event and immediately initiates a changeover from the second operating mode to the third operating mode (330).

Figure 4:
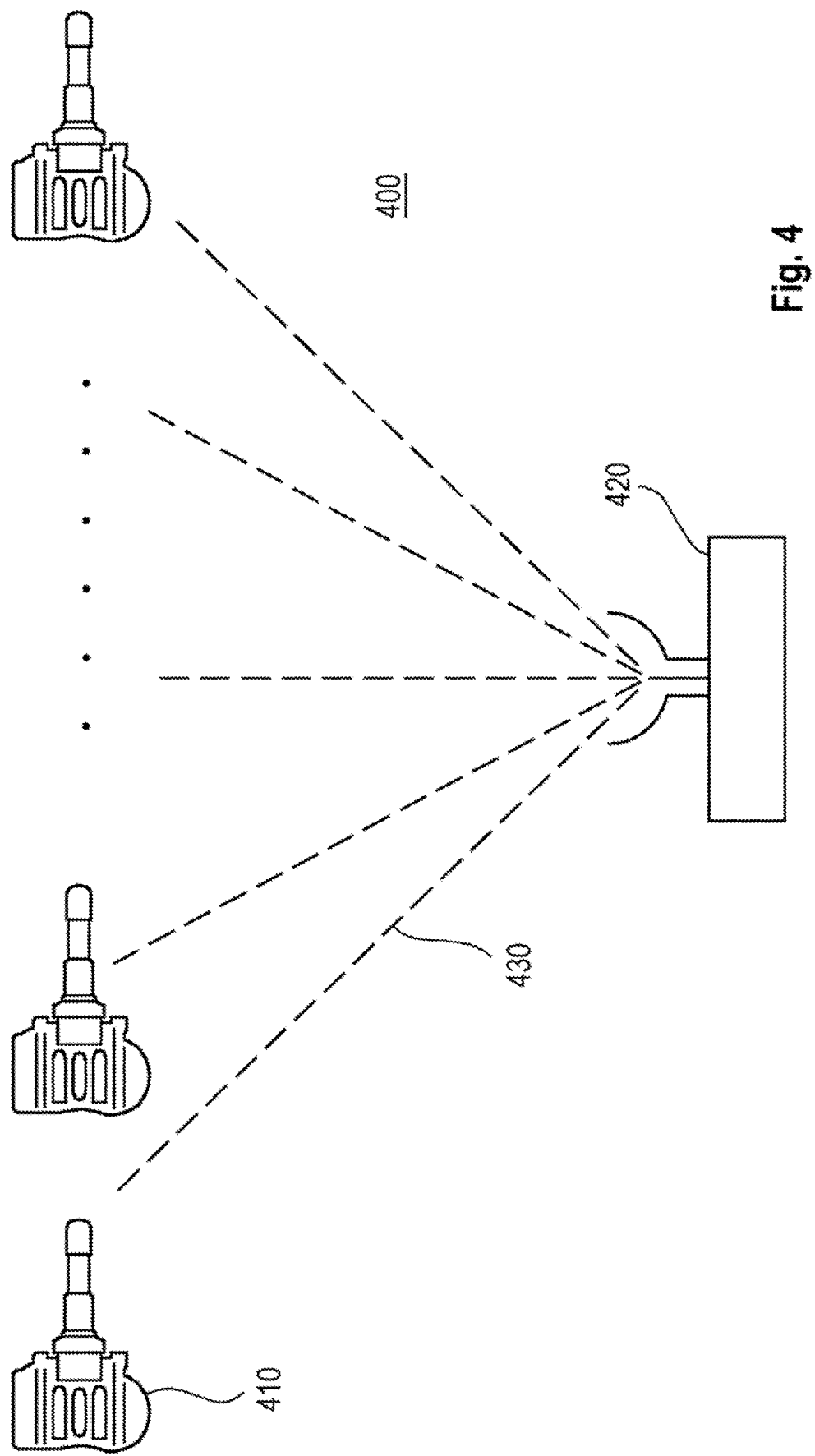
FIG. 4 illustrates a situation during the application of a wireless signal to all TPMS sensor modules, which contains information about a changeover from the first operating mode to the second operating mode.

FIG. 4 illustrates the arrangement (310) of the TPMS sensor modules and the application (320) of a signal to the TPMS sensor modules.

A number of TPMS sensor modules 410 are arranged within an environment 400. For example, the TPMS sensor modules 410 can be configured according to the example implementation shown in FIG. 2. The environment 400 can be a manufacturing hall of a company, for example, and may represent the situation after production of the TPMS sensor modules 410, for example. In some implementations, the TPMS modules 410 are arranged relatively near (e.g., within a threshold distance) to each other.

A transmitter 420 (e.g., a Bluetooth transmitter) is arranged within the environment 400 to broadcast a signal 430. The signal 430 contains the information or instruction to the TPMS sensor modules 410 to change over from the first operating state B1 to the second operating state B2. The signal 430 can be received from any of the TPMS sensor modules 410, so that all TPMS sensor modules 410 arranged within the environment 400 collectively change over from the first operating state B1 to the second operating state B2.

Figure 5:
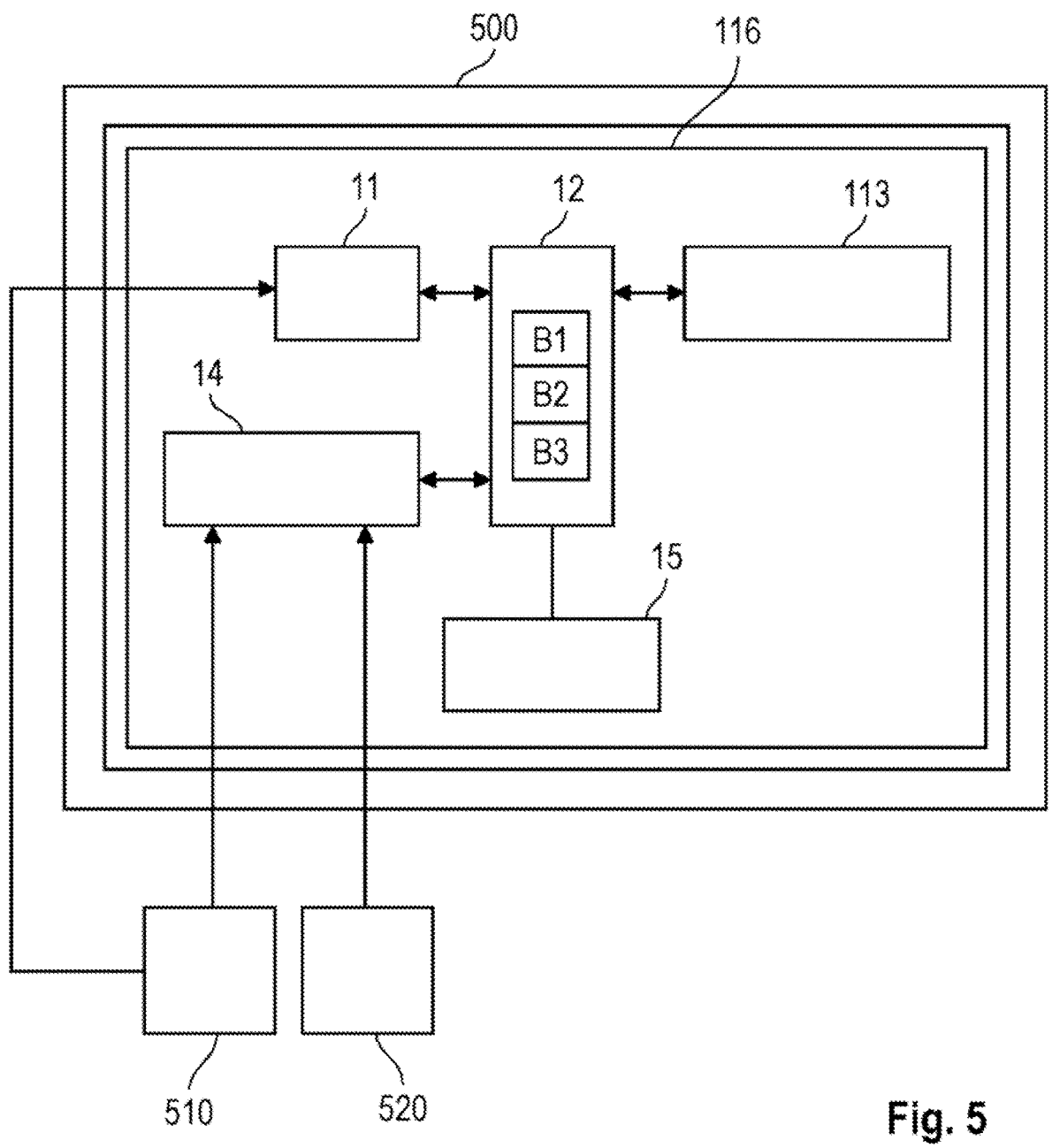
FIG. 5 illustrates a situation during the application of a physical parameter to a TPMS sensor module in such a way that the TPMS sensor module detects a measurement event and changes over from the second operating mode to the third operating mode.

FIG. 5 illustrates the application (330) of a physical parameter generated by an external source to a TPMS sensor module 500 from the number of TPMS sensor modules.

The application of a physical parameter can be one or more of the following:
- applying an ultrasound signal;
- applying an acceleration;
- applying a temperature change;
- applying a vibration;
- applying a pressure change;
- attaching a tire, to which the TPMS sensor module is attached, to a vehicle using a pneumatic screwdriver and thereby applying a vibration;
- attaching a tire, to which the TPMS sensor module is attached, to a vehicle and applying an acceleration as a result of a change in the orientation of the tire;
- applying a magnetic field;
- placing a metallic object near to the TPMS sensor module and thereby applying a change in an electric field or capacitance.

The following table summarizes once again the possible external sources of the physical parameter and the sensors of the TPMS sensor module respectively required for detection.

| External Source | Sensor |
| --- | --- |
| Ultrasound source | Acceleration or pressure sensor or microphone |
| Heat source | Temperature sensor |
| Vibration plate | Acceleration sensor |
| Pneumatic screwdriver (for mounting the wheels on the vehicle) | Acceleration sensor |
| Changing the wheel orientation from horizontal to vertical (mounting the wheels on the vehicle) | Acceleration sensor |
| Magnetic field | Magnetic field sensor |
| Approaching the module with a conductive material | Capacitive proximity sensor |
| Electric field | Antenna |

FIG. 5 shows in schematic form two external sources 510 and 520 and their action on the corresponding sensors of the TPMS sensor module 500. For example, a first external source 510 can be an ultrasound source and can therefore act on both the pressure sensor 11 and the acceleration sensor 14. For example, a second external source 520 can be a vibration plate, for example, and can therefore act on the acceleration sensor 14.

The sensors are continuously read out by the microcontroller 12 during this phase. When the microcontroller 12 receives a measurement result from one of the sensors which is above a predetermined threshold value, the microcontroller 12 changes the module 500 from the second operating state B2 to the third operating state B3, which is indicated by the arrow in FIG. 5. Setting thresholds prevents random events, such as vibrations, from initiating an unintended change in the operating mode. Therefore, the external source may act on the TPMS sensor module 500 and the corresponding sensor with sufficient signal strength so that the corresponding threshold value is reliably exceeded.

ASPECTS

In the following, devices and methods according to the disclosure are explained based on aspects.

Aspect 1 is a tire-pressure monitoring system (TPMS) sensor module, comprising a pressure sensor which is configured to measure an internal air pressure of a tire and to generate tire-pressure information, an optional additional sensor, a transmitting/receiving device, a microcontroller unit which is configured to operate the TPMS sensor module in one of three or more different operating modes, wherein a first operating mode includes an inactive standby state, a second operating mode includes a measurement of a physical parameter using the pressure sensor and/or the additional sensor and reading the pressure sensor and/or the additional sensor using the microcontroller unit, and a third operating mode, and wherein in the second operating mode the microcontroller unit is configured to initiate a changeover from the second operating mode to the third operating mode when reading out a specified measurement event.

Aspect 2 is a TPMS sensor module according to aspect 1, in which the third operating mode includes a test procedure of the pressure sensor and/or the additional sensor.

Aspect 3 is a TPMS sensor module according to aspect 1 or 2, in which the additional sensor is selected from a group consisting of an acceleration sensor, a temperature sensor, a magnetic field sensor, an electrical antenna, and a capacitive proximity sensor, and the physical parameter is a pressure, an acoustic signal, an acceleration, a temperature, a magnetic field, an electrical field, or a capacitance.

Aspect 4 is a TPMS sensor module according to aspect 3, in which the specified measurement result is a specified value for a pressure, an acoustic signal, an acceleration, a temperature, a magnetic field, an electrical field, and/or a capacitance.

Aspect 5 is a TPMS sensor module according to any of the previous aspects, in which the transmitting/receiving device is configured to receive a signal containing information about a changeover from the first operating mode to the second operating mode, and the microcontroller unit is configured to initiate a changeover from the first operating mode to the second operating mode after receiving the signal.

Aspect 6 is a TPMS sensor module according to any of the previous aspects, in which the transmitting/receiving device is a Bluetooth or WLAN transmitting/receiving device.

Aspect 7 is a TPMS sensor module according to any of the previous aspects, also comprising a conductor loop integrated in the module housing and acting as an antenna, which is connected to the transmitting/receiving device.

Aspect 8 is a TPMS sensor module according to any of the preceding aspects, in which the microcontroller unit is configured to maintain the second operating mode for a predetermined time period and to terminate the second operating mode after expiry of the time period if no specified measurement event has been measured.

Aspect 9 is a TPMS sensor module according to aspect 8, in which the microcontroller unit is configured to maintain the second operating mode for a predetermined time period and after expiry of the time period to change over to the first operating mode, perform error handling, and/or issue an error message if no specified measurement event has been measured.

Aspect 10 is a TPMS sensor module according to any of the previous aspects, in which the acceleration sensor is configured as a microphone, such as as a micro-electromechanical (MEMS) microphone.

Aspect 11 is a method for adjusting a tire-pressure monitoring system (TPMS) sensor module according to aspect 1, which method comprises: arranging a number of TPMS sensor modules according to aspect 1 within an environment; applying to all TPMS sensor modules a signal containing information about a changeover from the first operating mode to the second operating mode; and applying a physical parameter to a TPMS sensor module from the number of TPMS sensor modules in such a way that the TPMS sensor module detects a measurement event and changes over from the second operating mode to the third operating mode.

Aspect 12 is a method according to aspect 11, in which the application of a physical parameter is one or more of the following: applying an ultrasound signal; applying an acceleration; applying a temperature change; applying a vibration; applying a pressure change; attaching a tire, to which the TPMS module is attached, to a vehicle using a pneumatic screwdriver and thereby applying a vibration; attaching a tire, to which the TPMS module is attached, to a vehicle and applying an acceleration as a result of a change in the orientation of the tire; applying a magnetic field; or placing a metallic object near to the TPMS module and thereby applying a change in an electric field or a capacitance thereto.

Although specific implementations have been illustrated and described here, those who are familiar with this technical field will realize that a plurality of alternative and/or equivalent implementations can replace the specific implementations shown and described without exceeding the scope of the present disclosure. This application is intended to cover all modifications or variations of the specific implementations discussed herein. It is therefore intended that this disclosure is limited only by the claims and their equivalents.

What is claimed is:

1. A tire-pressure monitoring system (TPMS) sensor module, comprising:
    a pressure sensor configured to measure an internal air pressure of a tire and to generate tire pressure information;
    a transmitting/receiving device; and
    a microcontroller unit configured to operate the TPMS sensor module in a plurality of operating modes, wherein
        a first operating mode, of the plurality of operating modes, includes an inactive standby state,
        a second operating mode, of the plurality of operating modes, includes a measurement of a physical parameter using one or more of the pressure sensor or an additional sensor and a reading of the one or more of the pressure sensor or the additional sensor using the microcontroller unit, and
        a third operating mode, of the plurality of operating modes, and wherein
        in the second operating mode, the microcontroller unit is configured to initiate a changeover from the second operating mode to the third operating mode based on reading a specified measurement event.

2. The TPMS sensor module as claimed in claim 1, wherein
    the third operating mode includes a test procedure of one or more of the pressure sensor or the additional sensor.

3. The TPMS sensor module as claimed in claim 1, wherein
    the additional sensor includes one or more of an acceleration sensor, a temperature sensor, a magnetic field sensor, an electrical antenna, or a capacitive proximity sensor, and the physical parameter comprises one or more of a pressure, an acoustic signal, an acceleration, a temperature, a magnetic field, an electric field, or a capacitance.

4. The TPMS sensor module as claimed in claim 3, wherein
    the specified measurement event is a specified value for one or more of a pressure, an acoustic signal, an acceleration, a temperature, a magnetic field, an electric field, or a capacitance.

5. The TPMS sensor module as claimed in claim 1, wherein
    the transmitting/receiving device is configured to receive a signal that contains information indicating a changeover from the first operating mode to the second operating mode, and
    the microcontroller unit is configured to initiate a changeover from the first operating mode to the second operating mode based on receiving the signal.

6. The TPMS sensor module as claimed in claim 1, wherein
    the transmitting/receiving device is a Bluetooth transmitting/receiving device or a WLAN transmitting/receiving device.

7. The TPMS sensor module as claimed in claim 1, further comprising
    a conductor loop integrated in a housing of the TPMS sensor module and functioning as an antenna, wherein the conductor loop is connected to the transmitting/receiving device.

8. The TPMS sensor module as claimed in claim 1, wherein
    the microcontroller unit is configured to maintain the second operating mode for a predetermined time period and to terminate the second operating mode after expiry of the predetermined time period if no specified measurement event has been measured.

9. The TPMS sensor module as claimed in claim 8, wherein
    the microcontroller unit is configured to maintain the second operating mode for a predetermined time period and after expiry of the predetermined time period, and
    if no specified measurement event has been measured, the microcontroller is configured to one or more of: change over to the first operating mode, perform error handling, or issue an error message.

10. The TPMS sensor module as claimed in claim 1, wherein
    the TPMS sensor module includes an acceleration sensor is configured as a micro-electromechanical microphone.

11. A method for adjusting a tire-pressure monitoring system (TPMS) sensor module, the method comprising:
    arranging a number of TPMS sensor modules within an environment);
    applying, to the number of TPMS sensor modules, a signal containing information associated with a change from a first operating mode to a second operating mode, wherein the first operating mode includes an inactive standby state, and
    wherein the second operating mode includes measuring a physical parameter using one or more of a pressure sensor or an additional sensor of the TPMS sensor module and reading the one or more of the pressure sensor or the additional sensor; and
    applying a physical parameter to a TPMS sensor module, of the number of TPMS sensor modules, wherein the TPMS sensor module detects a measurement event and changes over from the second operating mode to a third operating mode based on detecting the measurement event.

12. The method as claimed in claim 11, wherein applying the physical parameter includes one or more of:
   applying an ultrasound signal to the TPMS sensor module;
   applying an acceleration to the TPMS sensor module;
   applying a temperature change to the TPMS sensor module;
   applying a vibration to the TPMS sensor module;
   applying a pressure change to the TPMS sensor module;
   attaching a tire, to which the TPMS sensor module is attached, to a vehicle;
   applying a magnetic field to the TPMS sensor module; or
   applying a change in one or more of an electric field or a capacitance.

13. A tire-pressure monitoring system (TPMS) sensor module, comprising:
   a sensor configured to:
      measure a physical parameter of a tire associated with the TPMS sensor module, and
      generate measurement data based on measuring the physical parameter; and
   a microcontroller unit configured to:
      cause the TPMS sensor module to operate in a first operating mode associated with an inactive standby state;
      cause the TPMS sensor module to operate in a second operating mode,
         wherein the sensor, based on the TPMS sensor module operating in the second operating mode, measures the physical parameter and generates the measurement data based on measuring the physical parameter;
      receive the measurement data;
      determine an occurrence of a measurement event based on the measurement data; and
      initiate a changeover from the second operating mode to a third operating mode based on the occurrence of the measurement event,
         wherein a test procedure associated with the sensor is performed based on the changeover from the second operating mode to the third operating mode.

14. The TPMS sensor module of claim 13, wherein the sensor comprises one or more of:
   a pressure sensor,
   an acceleration sensor,
   a temperature sensor,
   a magnetic field sensor,
   an electrical antenna, or
   a capacitive proximity sensor.

15. The TPMS sensor module of claim 13, wherein the physical parameter comprises one or more of:
   a pressure,
   an acoustic signal,
   an acceleration, a temperature,
   a magnetic field,
   an electric field, or
   a capacitance.

16. The TPMS sensor module of claim 13, wherein the microcontroller unit, to determine the occurrence of the measurement event, is configured to:
   determine that the measurement data indicates a specified value for:
      a pressure measured by the sensor,
      an acoustic signal measured by the sensor,
      an acceleration measured by the sensor,
      a temperature measured by the sensor,
      a magnetic field measured by the sensor,
      an electric field measured by the sensor, or
      a capacitance measured by the sensor; and
   determine the occurrence of the measurement event based on the measurement data indicating the specified value.

17. The TPMS sensor module of claim 13, further comprising:
   a transmitting/receiving device configured to receive a signal that contains information indicating a changeover from the first operating mode to the second operating mode,
      wherein the microcontroller unit is configured to cause the TPMS sensor module to operate in the second operating mode based on the transmitting/receiving device receiving the signal.

* * * * *